US008246129B2

(12) United States Patent  
Wang et al.

(10) Patent No.: US 8,246,129 B2  
(45) Date of Patent: Aug. 21, 2012

(54) CARRIER

(75) Inventors: Wen-Chen Wang, Taipei Hsien (TW); Ping-Hung Chen, Taipei Hsien (TW); Wen-Tang Peng, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 339 days.

(21) Appl. No.: 12/649,294

(22) Filed: Dec. 29, 2009

(65) Prior Publication Data

US 2011/0101831 A1    May 5, 2011

(30) Foreign Application Priority Data

Oct. 30, 2009   (CN) .......................... 2009 1 0309140

(51) Int. Cl.  
*A47B 95/02* (2006.01)

(52) U.S. Cl. .................................................... 312/332.1

(58) Field of Classification Search ............... 312/223.1, 312/223.2, 348.6, 332.1; 361/727, 679.33, 361/679.34, 679.35, 679.36, 679.37, 679.38, 361/679.39

See application file for complete search history.

(56) References Cited

U.S. PATENT DOCUMENTS

| | | | |
|---|---|---|---|
| 6,185,106 B1 * | 2/2001 | Mueller | 361/798 |
| 6,442,021 B1 * | 8/2002 | Bolognia et al. | 361/679.34 |
| 6,603,657 B2 * | 8/2003 | Tanzer et al. | 361/679.33 |
| 6,798,650 B2 * | 9/2004 | Reznikov et al. | 361/679.33 |
| 6,952,341 B2 * | 10/2005 | Hidaka et al. | 361/679.32 |
| 7,864,522 B1 * | 1/2011 | Peng et al. | 361/679.33 |
| 7,944,691 B1 * | 5/2011 | Pounds | 361/679.59 |
| 2002/0101708 A1 * | 8/2002 | Cheng | 361/685 |
| 2004/0190266 A1 * | 9/2004 | Chung | 361/724 |
| 2006/0039106 A1 * | 2/2006 | Hidaka | 361/685 |
| 2007/0228904 A1 * | 10/2007 | Williams | 312/327 |
| 2008/0266781 A1 * | 10/2008 | Olesiewicz et al. | 361/685 |
| 2009/0279249 A1 * | 11/2009 | Crippen et al. | 361/679.58 |
| 2011/0273837 A1 * | 11/2011 | Jiang et al. | 361/679.37 |

* cited by examiner

*Primary Examiner* — James O Hansen  
*Assistant Examiner* — Matthew Ing  
(74) *Attorney, Agent, or Firm* — Altis Law Group, Inc.

(57) ABSTRACT

A carrier includes a tray for accommodating a data storage device, a bracket fixed to the tray, a retaining member pivotably attached to the bracket at a first end of the retaining member, a lever member pivotably mounted to the bracket, and a first resilient member located between the retaining member and the lever member. A latch protrudes out from the lever member. When the retaining member is pivoted to engage with the bracket, the first resilient member urges the lever member to pivot, thereby the latch of the lever member engaging with a chassis of an electronic device. A second end of the retaining member releasably engages with the bracket.

14 Claims, 6 Drawing Sheets

CARRIER

BACKGROUND

1. Technical Field

The disclosure relates to carriers, and particularly, to a carrier for data storage devices.

2. Description of Related Art

Generally, carriers for accommodating hard disk drives are not manufactured to very precise standards and can cause difficulties when mounting the carriers in bays of electronic devices.

DETAILED DESCRIPTION

Figure 1:
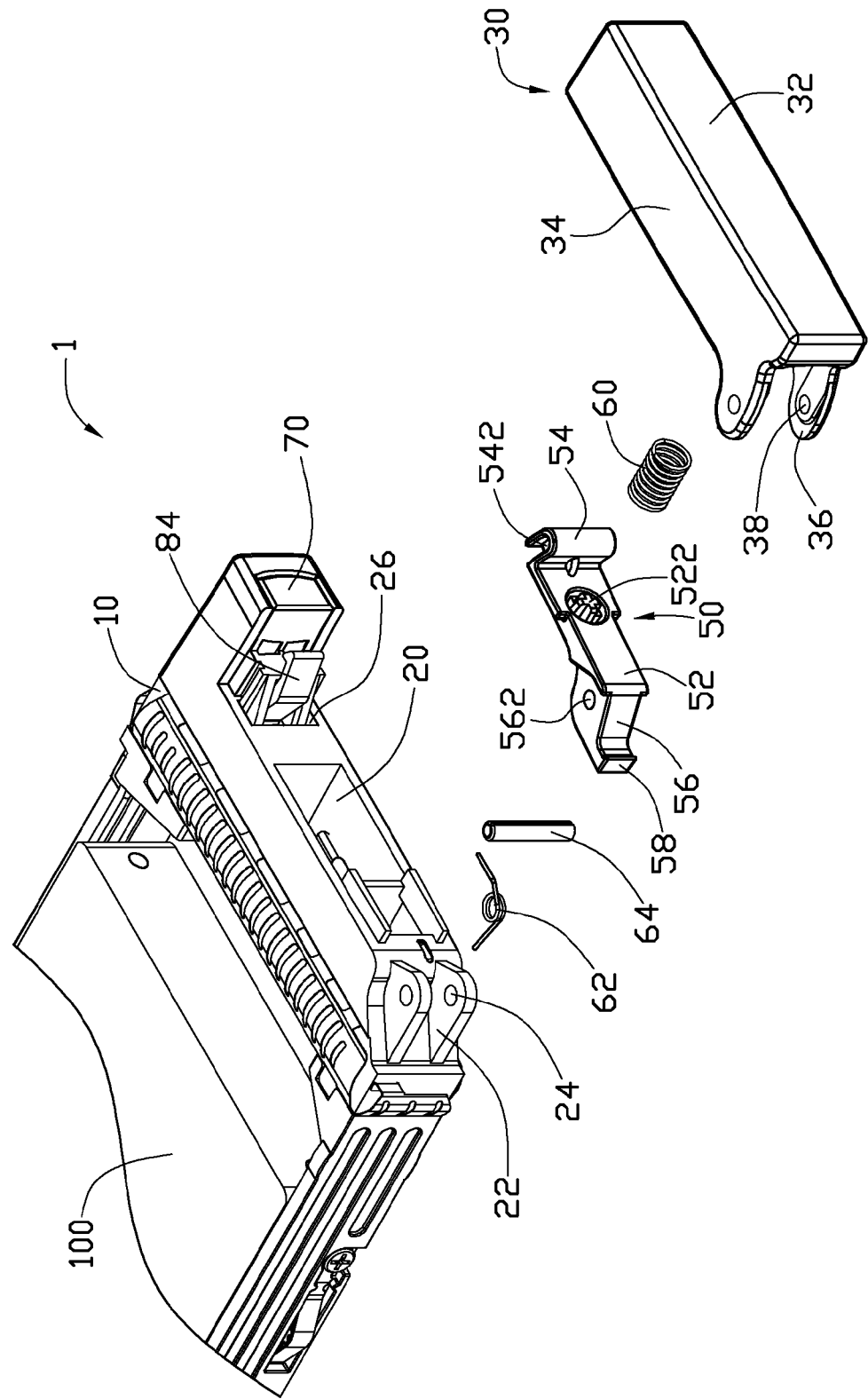
FIG. 1 is a partial, exploded, and isometric view of an exemplary embodiment of a carrier, together with a data storage device.
Figure 2:
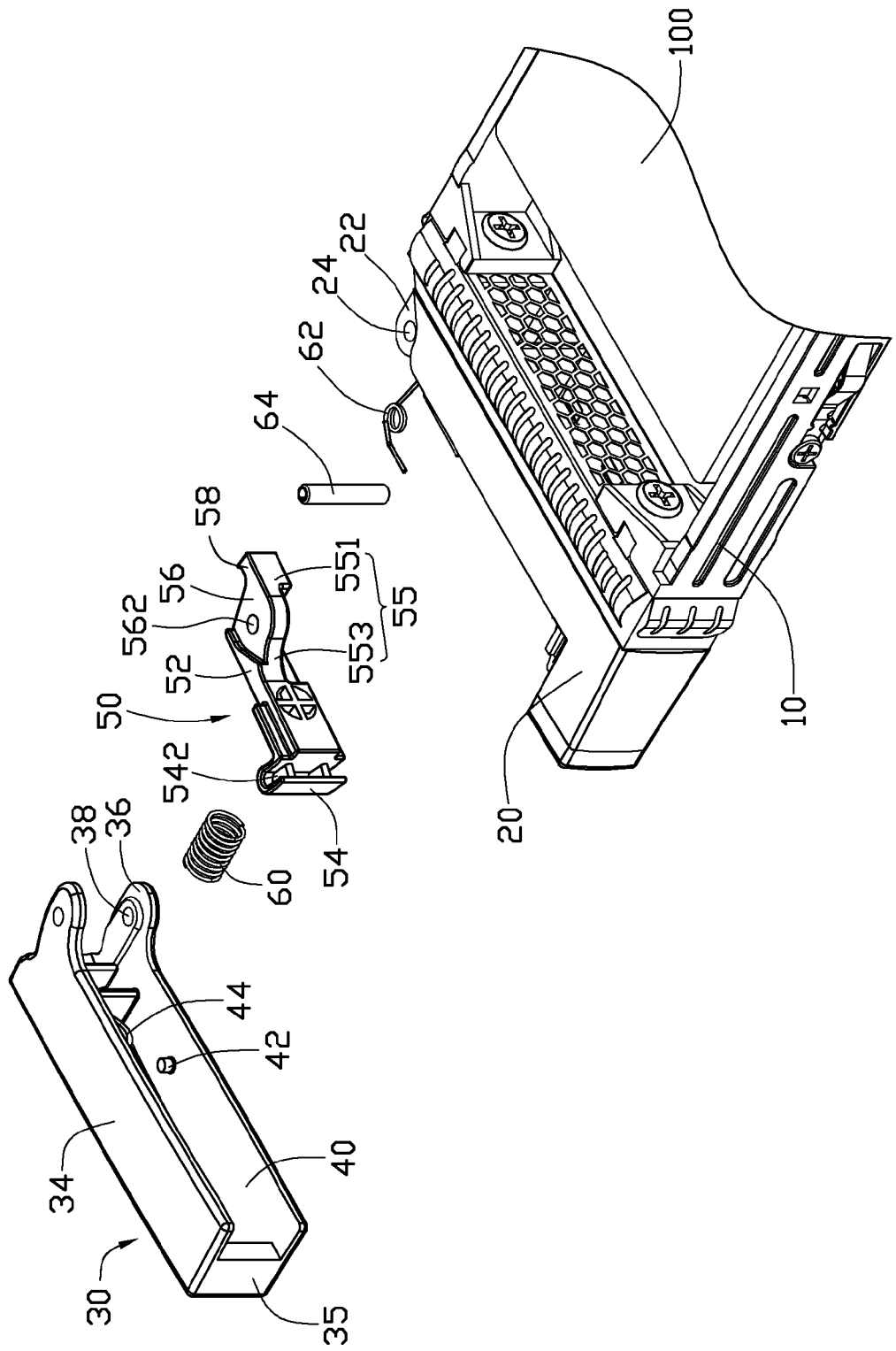
FIG. 2 is similar to FIG. 1, but viewed from another perspective.
Figure 3:
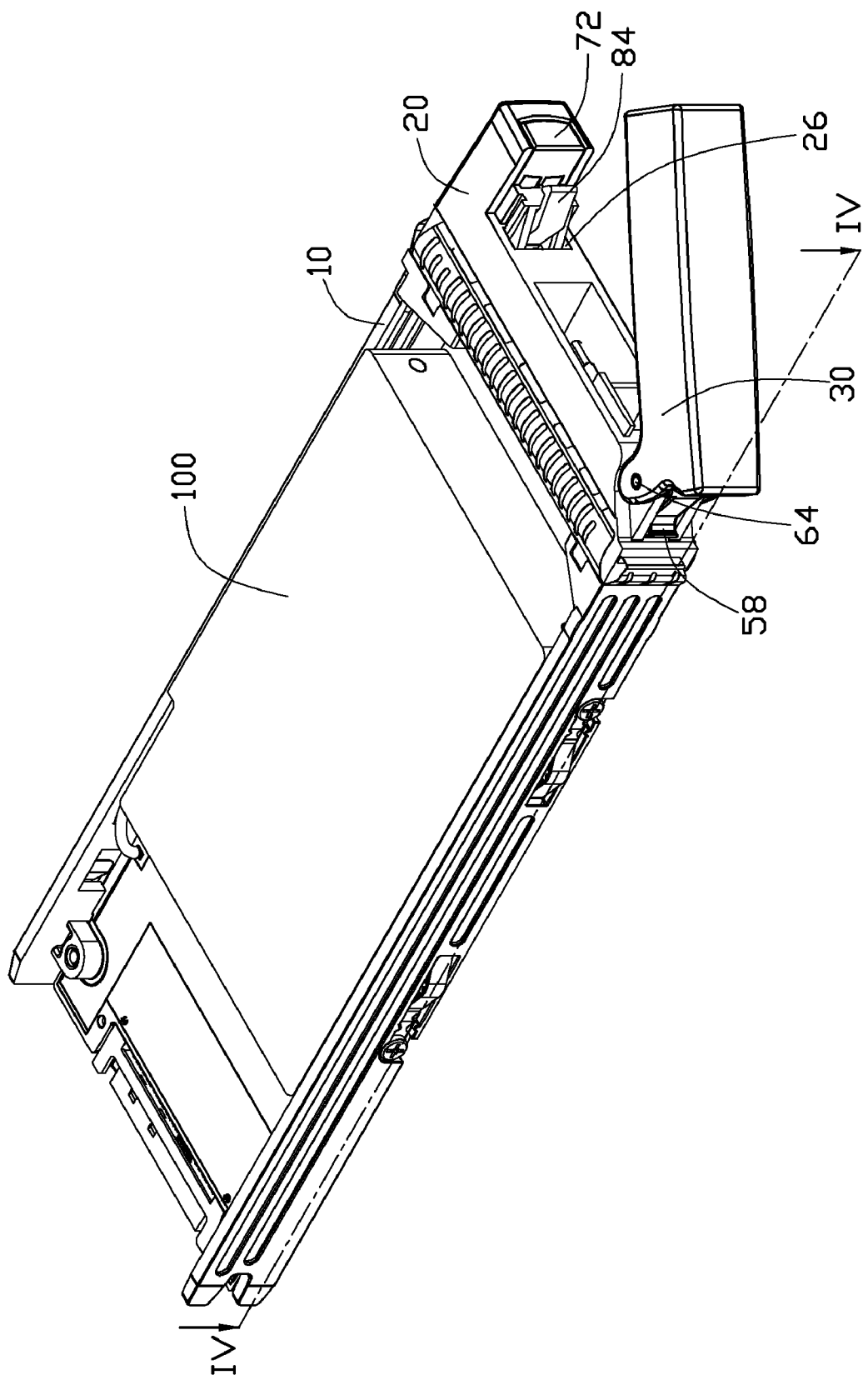
FIG. 3 is an assembled view of the carrier and the data storage device of FIG. 1 and shows the carrier in an open position.
Figure 4:
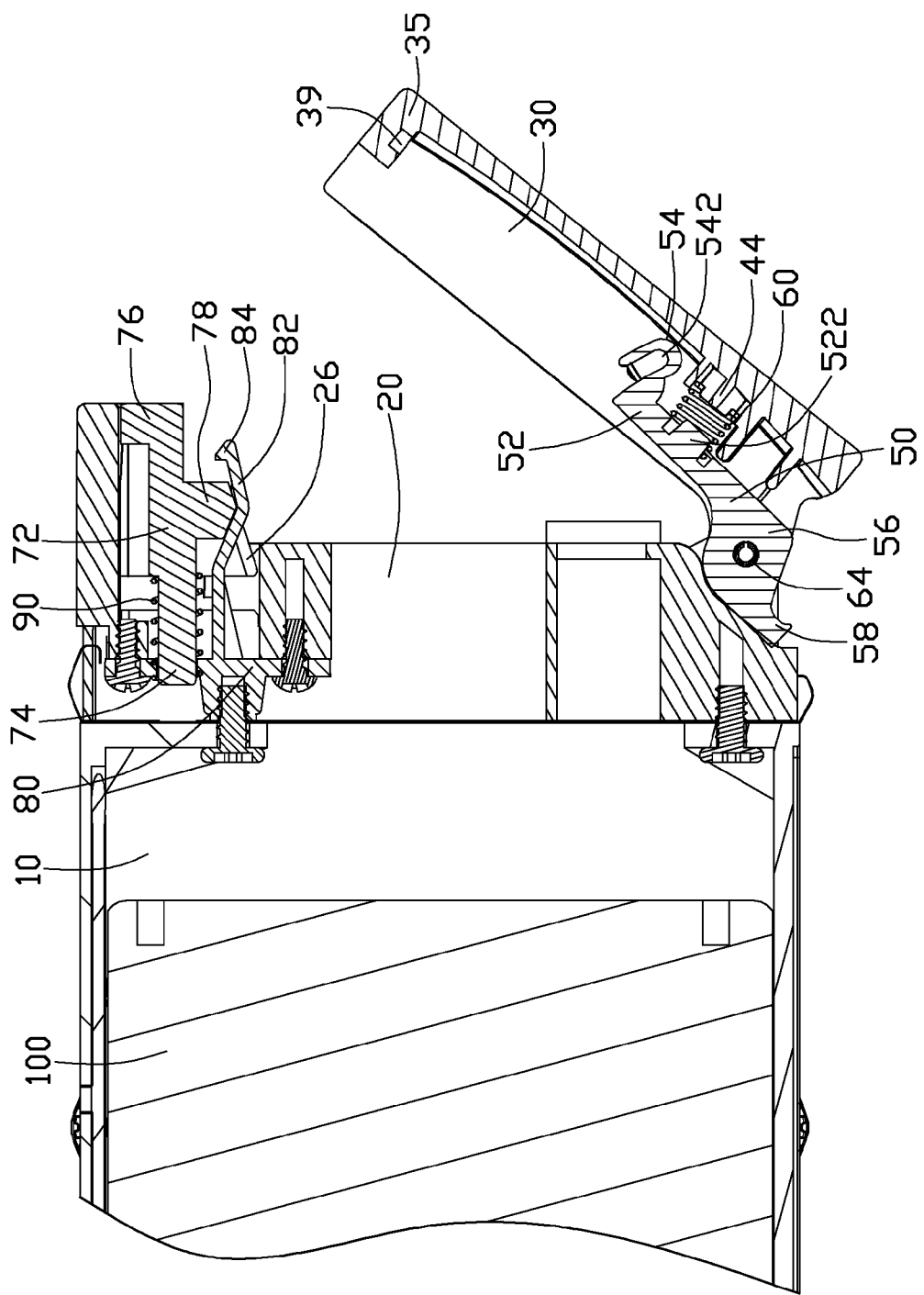
FIG. 4 is a partial, cross-section view taken along IV-IV of FIG. 3.

Referring to FIGS. 1 to 4, an exemplary embodiment of a carrier 1 includes a tray 10 sized to accommodate a data storage device such as a hard disk drive 100 therein, a bracket 20 fixed at the front of the tray 10, a retaining member 30, a lever member 50, a first resilient member, a second resilient member, a shaft 64, an operating member 70, and a hook member 80. In this exemplary embodiment, the first resilient member is a compressed coil spring 60, and the second resilient member is a torsion spring 62.

Figure 6:
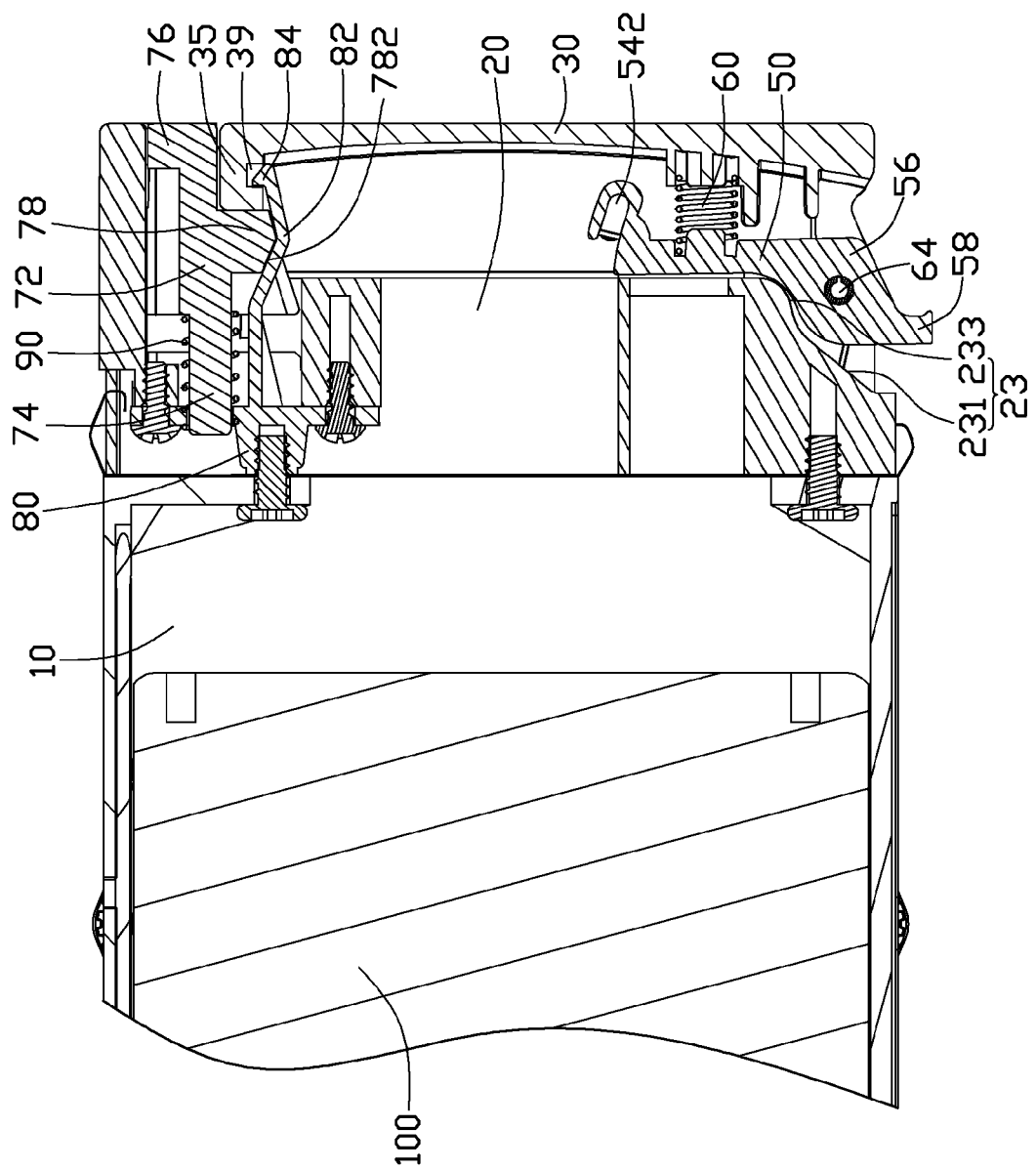
FIG. 6 is a partial, cross-section view taken along VI-VI of FIG. 5.

Referring also to FIG. 6, the bracket 20 includes a pair of tabs 22 formed at a first end thereof, and a fixing slot 26 defined in a second end thereof. A mounting hole 24 is defined in each tab 22. The bracket 20 further includes a first cam wall 23 located between the tabs 22. The first cam wall 23 includes a flat portion 231 and a convex portion 233.

The hook member 80 is mounted in the fixing slot 26 of the bracket 20. The hook member 80 includes a curved resilient finger portion 82 extending out of the fixing slot 26. A hook 84 is formed at a distal end of the finger portion 82.

The operating member 70 includes a slider 72 slidably received in the fixing slot 26, and a third resilient member. The slider 72 includes an urging bulge 78 perpendicularly extending from a side thereof, a post 74 extending from a first end thereof, and an L-shaped operating portion 76 formed at a second end thereof. A curved engaging wall 782 is formed at a distal end of the urging bulge 78, engaging with the curved finger portion 82 of the hook member 80. The post 74 is smaller than the slider 72. In this exemplary embodiment, the third resilient member is a compressed coil spring 90 fixed around the post 74 and abutting a flange portion formed between the post 74 and the slider 72, for restoring the slider 72.

The retaining member 30 is hollow and includes an elongated bezel 32, two elongated sidewalls 34 extending in the same direction from two opposite edges of the bezel 32, and an end wall 35 perpendicularly connected at one end of the bezel 32. A pair of spaced tongues 36 respectively protrudes out from the sidewalls 34, near to the other opposite end of the bezel 32. A fixing hole 38 is defined in each tongue 36. A receiving space 40 is defined among the sidewalls 34 and the bezel 32, for receiving the lever member 50 therein. A positioning post 44 protrudes from an inner surface of the bezel 32 and extends into the receiving space 40. A pair of locating posts 42 protrudes from inner surfaces of the two sidewalls 34 and extends into the receiving space 40. A locking hole 39 (shown in FIGS. 4 and 6) is defined in the end wall 35, for holding the hook 84 of the hook member 80.

The lever member 50 includes a body 52, and a bent portion 54 and a latching portion 56 respectively extending from two opposite ends of the body 52. A securing pin 522 protrudes from the body 52. A pair of U-shaped locating slots 542 is respectively defined in two opposite lateral sides of the bent portion 54, corresponding to the locating posts 42 of the retaining member 30. A through hole 562 is defined in the latching portion 56 corresponding to the shaft 64. The latching portion 56 includes a second cam wall 55 formed at an outer surface thereof. The second cam wall 55 includes a flat portion 551 and a concave portion 553. A latch 58 protrudes out from a distal end of the latching portion 56.

In assembly, the lever member 50 is received in the receiving space 40 of the retaining member 30, with the two locating posts 42 of the sidewalls 34 respectively slidably being received in the two locating slots 542 of the bent portion 54. Two ends of the compressed coil spring 60 are respectively positioned around the positioning post 44 of the retaining member 30 and the securing pin 522 of the lever member 50. The latching portion 56 of the lever member 50 is placed between the tongues 36 of the retaining member 30, with the through hole 562 aligning with the fixing holes 38. The combined retaining member 30 and lever member 50 are attached to the bracket 20. Each of the tabs 22 of the bracket 20 is sandwiched between one of the tongues 36 and the latching portion 56. The second cam wall 55 of the lever member 50 faces the first cam wall 23 of the bracket 20. The torsion spring 62 is placed between the latching portion 56 and the lower one of the tabs 22, with a center hole of the torsion spring 62 in alignment with the mounting holes 24, the fixing holes 38, and the through hole 562. The shaft 64 pivotably extends through the fixing holes 38, the mounting holes 24, the through hole 562, and the center hole of the torsion spring 62. Thus, the retaining member 30 and the lever member 50 are pivotably attached to the bracket 20.

Two extension legs of the torsion spring 62 respectively abut against the bracket 20 and the lever member 50, thereby allowing the lever member 50 to pivot about the shaft 64. The coil spring 60 is compressed to allow the bent portion 54 of the lever member 50 to abut against the inner surface of the bezel 32 of the retaining member 30 and to allow the locating posts 42 of the retaining member 30 to slide from the bottoms of the locating slots 542 of the bent portion 54 to the entries of the locating slots 542. When the flat portion 551 of the second cam wall 55 abuts against the flat portion 231 of the first cam wall 23, the latch 58 of the lever member 50 is placed within the carrier 1 and the retaining member 30 is then in a fully open position.

Figure 5:
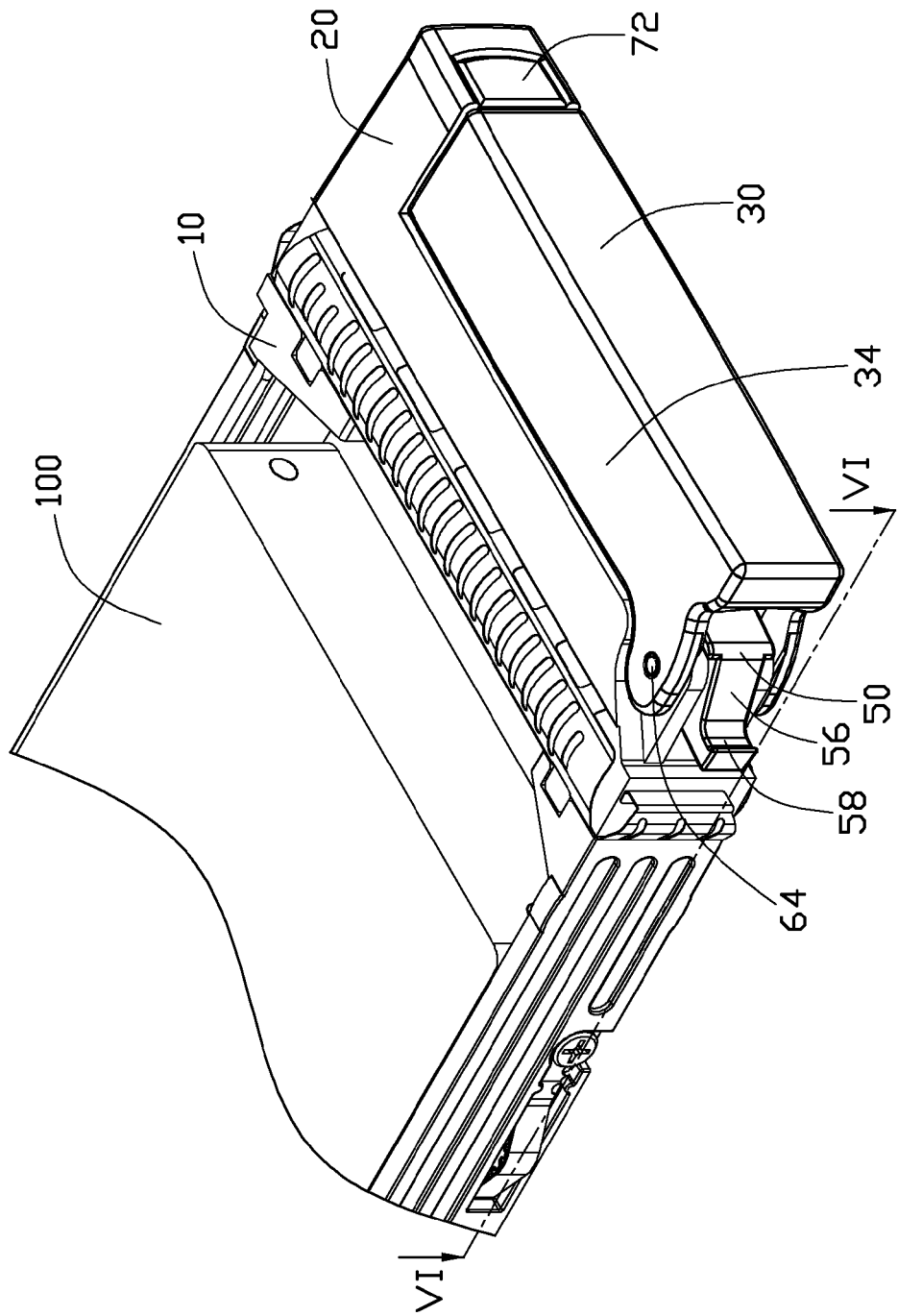
FIG. 5 is a partial, assembled view of the carrier and the data storage device of FIG. 1 and shows the carrier in a closed position.

Referring to FIGS. 5 and 6, to mount the hard disk drive 100 to a receiving rack of a chassis of an electronic device (not shown), the hard disk drive 100 is accommodated in the tray 10 of the carrier 1, then the carrier 1 is inserted into the receiving rack. The retaining member 30 is pivoted about the shaft 64 toward the bracket 20. The lever member 50 is pivoted together with the retaining member 30. The torsion spring 62 is resiliently deformed. The flat portion 551 of the latching portion 56 moves away from the flat portion 231 of the first cam wall 23. The coil spring 60 restores and exerts a force on the lever member 50 to push the bent portion 54 away from the bezel 32 of the retaining member 30. The lever member 50 pivots about the shaft 64, toward the bracket 20. The locating posts 42 slide from the entries of the locating slots 542 to the bottoms of the locating slots 542. Thus, the latch 58 of the latching portion 56 gradually extends out of the carrier 1.

The retaining member 30 is further pivoted toward the bracket 20. The end wall 35 of the retaining member 30 abuts the hook to deform the finger portion 82 of the hook member 80, to allow the retaining member 30 to continue pivoting. When the hook 84 engages in the locking hole 39 of the end wall 35, the finger portion 82 rebounds causing the hook 84 to engage in the locking hole 39 of the end wall 35. Thus, the retaining member 30 engages with the bracket 20 in a closed position. Simultaneously, the concave portion 553 of the latching portion 56 engages the convex portion 233 of the first cam wall 23. The latch 58 of the latching portion 56 engages with the receiving rack of the chassis. The coil spring 60 restores and exerts a force on the lever member 50, thereby allowing the latch 58 of the lever member 50 to firmly engage with the receiving rack of the chassis. Thus, the combined carrier 1 and data storage device 100 are steadily mounted in the chassis.

To remove the combined carrier 1 and data storage device 100 from the receiving rack of the chassis, press the operating portion 76 of the slider 72 to allow the slider 72 to slide relative to the bracket 20. The coil spring 90 is compressed. The urging bulge 78 of the slider 72 resiliently deforms the finger portion 82. Thus, the hook 84 is released from the locking hole 39 of the retaining member 30. When the slider 72 is released, the coil spring 90 restores to push the slider 72 to return its original position. The retaining member 30 is pivoted away from the second end of the bracket 20. The lever member 50 pivots together with the retaining member 30, with the locating posts 42 sliding in the locating slots 542. The concave portion 553 of the latching portion 56 is rotated away from the convex portion 233 of the first cam wall 23. Accordingly, the latch 58 of the latching portion 56 is removed from the receiving rack of the chassis.

When the flat portion 551 of the latching portion 56 abuts against the flat portion 231 of the first cam wall 23, the coil spring 60 is resiliently compressed, thereby the bent portion 54 of the lever member 50 abuts the bezel 32 of the retaining member 30. The latch 58 of the latching portion 56 is withdrawn within the carrier 1. The combined carrier 1 and data storage device 100 can be conveniently removed from the receiving rack of the chassis.

In another embodiment, the lever member 50 can be pivotably mounted to the bracket 20 or the retaining member 30 about the other axis but the shaft 64.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A carrier comprising:
a tray for accommodating a data storage device;
a bracket fixed to the tray;
a retaining member pivotably attached to the bracket at a first end of the retaining member, a second end of the retaining member releasably engaging with the bracket;
a lever member pivotably mounted to the bracket, a latch protruding out from the lever member; and
a first resilient member located between the retaining member and the lever member;
wherein when the retaining member is pivoted to engage with the bracket, the first resilient member urges the lever member to pivot, thereby the latch of the lever member firmly engaging with a chassis of an electronic device;
wherein the retaining member comprises a bezel, and two sidewalls extending in the same direction from two opposite edges of the bezel, the lever member is received in a receiving space defined by the sidewalls;
wherein a pair of locating posts protrudes from opposite inner surfaces of the two sidewalls, a bent portion extends from the lever member, a pair of locating slots is respectively defined in the bent portion to slidably receive the two locating posts; and
wherein each of the pair of locating slots is U-shaped, the locating posts slide between bottoms of the locating slots and entries of the locating slots when the lever member pivots.

2. The carrier of claim 1, wherein a pair of spaced tabs each defining a mounting hole protrudes from the bracket, a pair of spaced tongues each defining a fixing hole correspondingly protrudes from the first end of the retaining member, and a shaft engages in the mounting holes and the fixing hole to pivotably attach the retaining member to the bracket.

3. The carrier of claim 2, wherein a through hole is defined in the lever member to receive the shaft, thereby pivotably attaching the lever member to the bracket.

4. The carrier of claim 3, further comprising a second resilient member for urging the lever member to pivot when the retaining member is released from the bracket, thereby the latch of the lever member removes from the chassis.

5. The carrier of claim 4, wherein the second resilient member is a torsion spring positioned between the bracket and the lever member.

6. The carrier of claim 3, wherein the retaining member comprises a bezel a positioning post protruding from the bezel; a securing pin protrudes from the lever member, and the first resilient member is a coil spring with two ends thereof positioned around the positioning post the securing pin, respectively.

7. The carrier of claim 1, wherein the through hole of the lever member is located between the latch and the bent portion.

8. The carrier of claim 1, further comprising a hooking member attached to the bracket to allow the retaining member to engage with the bracket.

9. The carrier of claim 8, wherein a locking hole is defined in the retaining member, a hook is formed on the hook member to releasably engage in the locking hole.

10. The carrier of claim 9, further comprises a slider slidably received in a fixing slot defined in the bracket, and a third resilient member; wherein the slider comprises an urging bulge extending from a side thereof; the hook member comprises a resilient finger portion engaging with the urging bulge, the slider is pressed to drive the urging bulge to resiliently deform the finger portion, thereby releasing the hook from the locking hole, the third resilient member is fixed around the slider to restore the slider.

11. A carrier comprising:
- a tray for accommodating a data storage device;
- a bracket fixed to the tray;
- a retaining member pivotably attached to the bracket;
- a lever member pivotably mounted to one of the bracket and the retaining member, a latch protruding out from the lever member; and
- a first resilient member located between the retaining member and the lever member;
- wherein when the retaining member is pivoted to engage with the bracket, the first resilient member urges the lever member to pivot, thereby the latch of the lever member engaging with a chassis of an electronic device;
- wherein the retaining member comprises two sidewalls with a pair of locating posts protruding from opposite inner surfaces thereof, a pair of U-shaped locating slots is respectively defined in the lever member to slidably receive the two locating posts, the two locating posts are slid to the bottoms of the two locating slots in response to the retaining member pivoting away from the bracket to drive the lever member to pivot together with the retaining member, such that the latch of the lever member disengages with the chassis.

12. The carrier of claim 11, wherein a pair of spaced tabs each defining a mounting hole protrudes from the bracket, a pair of spaced tongues each defining a fixing hole protrudes from the retaining member, and a shaft engages in the mounting holes and the fixing hole to pivotably attach the retaining member to the bracket.

13. The carrier of claim 12, wherein a first cam wall with a convex portion is formed adjacent to the spaced tabs of the bracket, the lever member comprises a latching portion with the latch protruding from a distal end thereof, a second cam wall with a concave portion is formed on the latching portion, and when the latch of the lever member engages with the chassis, the concave portion of the second cam wall engages with the convex portion of the first cam wall.

14. The carrier of claim 13, wherein the first cam wall comprises a flat portion, the second cam wall comprises a flat portion for engaging the flat portion of the first cam wall when the latch of the lever portion is released from the chassis.

* * * * *